US010074020B2

(12) United States Patent
Yan et al.

(10) Patent No.: US 10,074,020 B2
(45) Date of Patent: Sep. 11, 2018

(54) VEHICULAR LANE LINE DATA PROCESSING METHOD, APPARATUS, STORAGE MEDIUM, AND DEVICE

(71) Applicant: Baidu Online Network Technology (Beijing) Co., Ltd., Beijing (CN)

(72) Inventors: Tao Yan, Beijing (CN); Ruisuo Wang, Beijing (CN); Liang Song, Beijing (CN); Zhaoyan Jiang, Beijing (CN); Yang Yan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/128,403

(22) PCT Filed: Dec. 29, 2015

(86) PCT No.: PCT/CN2015/099423
§ 371 (c)(1),
(2) Date: Oct. 4, 2016

(87) PCT Pub. No.: WO2017/041396
PCT Pub. Date: Mar. 16, 2017

(65) Prior Publication Data
US 2018/0181817 A1    Jun. 28, 2018

(30) Foreign Application Priority Data
Sep. 10, 2015  (CN) .......................... 2015 1 0574875

(51) Int. Cl.
*G06F 19/00* (2018.01)
*G06K 9/00* (2006.01)
(Continued)

(52) U.S. Cl.
CPC ........... *G06K 9/00798* (2013.01); *G06N 3/02* (2013.01); *G06T 17/05* (2013.01)

(58) Field of Classification Search
CPC ....... G06K 9/00798; G06N 3/02; G06T 17/05
See application file for complete search history.

(56) References Cited

U.S. PATENT DOCUMENTS

| 6,546,118 B1 * | 4/2003 | Iisaka ................ G06K 9/00798 340/907 |
| 7,809,722 B2 * | 10/2010 | Gokturk ............ G06F 17/30256 382/305 |

(Continued)

FOREIGN PATENT DOCUMENTS

| CN | 101339616 A | 1/2009 |
| CN | 102385698 A | 3/2012 |
| CN | 102592114 A | 7/2012 |

OTHER PUBLICATIONS

Li, Jun; Mei, Xue; Prokrorov, Danil; Tao, Dacheng. "Deep Neural Network for Structural Prediction and Lane Detection in Traffic Scene". Mar. 2017. IEEE Transactions on Neural Networks and Learning Systems, vol. 28, No. 3, pp. 690-703 (Year: 2017).*

(Continued)

*Primary Examiner* — Nicholas Kiswanto
(74) *Attorney, Agent, or Firm* — Knobbe, Martens Olson & Bear LLP (57) ABSTRACT

Some embodiments of the present disclosure disclose a vehicular lane line data processing method, apparatus, storage medium, and device. The method includes: acquiring at least two consecutive original images of a vehicular lane line and positioning data of the original images; calculating, using a deep neural network model, a pixel confidence; determining an outline of the vehicular lane line and using the outline of the vehicular lane line as a candidate vehicular lane line; calculating a vehicular lane line confidence; filtering the candidate vehicular lane line; recognizing attribute information of the vehicular lane line; and determining map data of the vehicular lane line. The vehicular lane line data (Continued)

can be efficiently and precisely determined, the labor costs in high-precision map production is greatly reduced, and the mass production of high-precision maps can be achieved.

18 Claims, 4 Drawing Sheets

(51) Int. Cl.
*G06T 17/05* (2011.01)
*G06N 3/02* (2006.01)

(56) References Cited

U.S. PATENT DOCUMENTS

| | | | |
|---|---|---|---|
| 9,081,385 B1* | 7/2015 | Ferguson | G06K 9/00798 |
| 9,884,623 B2* | 2/2018 | Fasola | B60W 30/12 |
| 2014/0267263 A1 | 9/2014 | Beckwith et al. | |
| 2016/0239983 A1* | 8/2016 | Dorum | G06T 11/20 |
| 2017/0006261 A1* | 1/2017 | Debilde | H04N 7/18 |
| 2017/0169313 A1* | 6/2017 | Choi | G06K 9/6267 |

OTHER PUBLICATIONS

Virgo, Michael. "Lane Detection with Deep Learning". https://towardsdatascience.com/lane-detection-with-deep-learning-part-1-9e096f3320b7. May 2017 (Year: 2017).*

Hillel, Ahron Bar, et al., "Recent progress in road and lane direction: a survey", Feb. 7, 2012, pp. 727-745, Machine Vision and Applications Springer-Verlag.

Huval, Brody, et al., "An Empirical Evaluation of Deep Learning on Highway Driving", Apr. 17, 2015, pp. 1-7 retrieved from https://arxiv.org/pdf/1504.01716.

Kim, Jihun, et al., "Robust Lane Detection Based on Convolutional Neural Network and Random Sample Consensus", pp. 454-461, 2014, ICONIP 2014, Part I, LNCS 8834, Springer International Publishing, Switzerland.

* cited by examiner

VEHICULAR LANE LINE DATA PROCESSING METHOD, APPARATUS, STORAGE MEDIUM, AND DEVICE

CROSS REFERENCE TO RELATED APPLICATIONS

This patent application claims the priority from Chinese Patent Application No. 201510574875.7 filed by the applicant, Baidu Online Network Technology (Beijing) Co., Ltd., on Sep. 10, 2015 and entitled "Vehicular Lane Line Data Processing Method And Apparatus," which is incorporated herein by reference in its entirety.

TECHNICAL FIELD

The embodiments of the present disclosure relate to a map data processing technology, and in particular to a vehicular lane line data processing method, apparatus, storage medium, and device.

BACKGROUND

Three-dimensional high-precision maps are recognized in the industry and academia as the major development direction of the next-generation digital maps, which is a prerequisite for realizing the self-driving and assisted driving of automobiles, and provides a major foundation for the precise positioning and right decision of self-driving automobiles. The high-precision map is also an important strategic platform resource for analyzing the road utilization status and achieving intelligent transportation. The main issue in producing the three-dimensional high-precision map concentrates on the detection and generation of road lane information, i.e., using the three-dimensional digital map to precisely reconstruct road network lane information in the real world.

Currently, there are mainly two approaches for the detection and generation of vehicular lane lines. One is a manual approach, by comparing road images and point cloud information acquired by an industrial camera, the stitched point clouds are colored by utilizing the road images, and the road lane information such as vehicular lane lines on the colored point cloud are manually drawn and labelled. The other approach is to detect the vehicular lane lines in the images by using an automatic recognition method, whereby the vehicular lane lines are detected and filtered through band-pass filters and various priori rules.

The first approach to detect and generate vehicular lane lines has low efficiency and high labor cost. The drawing of three-dimensional lines such as the vehicular lane lines on the three-dimensional point cloud is difficult to interact, the drawn lines are tortuous, the manual operation has low efficiency. Because the point cloud has a low resolution, it is very likely to leave out vehicular lane lines during the drawing. However, the algorithm and solution applied in the second approach to detect and generate vehicular lane lines mainly serve the real-time vehicular lane line detection in automated driving, and remain mainly experimental, and the effectiveness and physical precision of the detection cannot meet the production requirements of the high-precision maps. Thus it can be seen that the existing vehicular lane line detection and generation methods need to be further improved.

SUMMARY

An objective of the embodiments of the present disclosure is to provide a vehicular lane line data processing method, apparatus, storage medium, and device, in order to achieve the efficient and accurate recognition of map data of vehicular lane lines.

According to a first aspect of the present disclosure, the present disclosure provides a vehicular lane line data processing method, which includes:

acquiring at least two consecutive original images of a vehicular lane line and positioning data of the original images;

calculating, using a deep neural network model, a pixel confidence for a conformity between a pixel characteristic in the original images and a vehicular lane line characteristic;

determining an outline of the vehicular lane line from the original images and using the outline of the vehicular lane line as a candidate vehicular lane line;

calculating a vehicular lane line confidence of the candidate vehicular lane line based on the pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line; and determining map data of the vehicular lane line based on the attribute information of the vehicular lane line and the positioning data during shooting of the original images.

According to a second aspect of the present disclosure, the present disclosure further provides a vehicular lane line data processing apparatus, which includes:

an original image acquiring module for acquiring at least two consecutive original images of a vehicular lane line and positioning data of the original images;

a pixel confidence calculating module for calculating, using a deep neural network model, a pixel confidence for a conformity between a pixel characteristic in the original images and a vehicular lane line characteristic;

a candidate vehicular lane line determining module for determining an outline of the vehicular lane line from the original images and using the outline of the vehicular lane line as a candidate vehicular lane line;

a candidate vehicular lane line confidence calculating module for calculating a vehicular lane line confidence of the candidate vehicular lane line based on the pixel confidences of pixels in the candidate vehicular lane line;

a candidate vehicular lane line filtering module for filtering the candidate vehicular lane line based on the vehicular lane line confidence of the candidate vehicular lane line;

a vehicular lane line attribute information recognizing module for recognizing, for the filtered vehicular lane line, attribute information of the vehicular lane line; and a vehicular lane line map data generating module for determining map data of the vehicular lane line based on the attribute information of the vehicular lane line and the positioning data during shooting of the original images.

According to a third aspect of the present disclosure, the present disclosure further provides a storage media comprising computer executable instructions, which, when executed by a processor of a computer, execute a vehicular lane line data processing method, the method comprising:

acquiring at least two consecutive original images of a vehicular lane line and positioning data of the original images;

calculating, using a deep neural network model, a pixel confidence for a conformity between a pixel characteristic in the original images and a vehicular lane line characteristic;

determining an outline of the vehicular lane line from the original images and using the outline of the vehicular lane line as a candidate vehicular lane line;

calculating a vehicular lane line confidence of the candidate vehicular lane line based on the pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line; and determining map data of the vehicular lane line based on the attribute information of the vehicular lane line and the positioning data during shooting of the original images.

According to a fourth aspect of the present disclosure, the present disclosure further provides a device, the device including:

one or more processors, a memory, and one or more programs, the one or more programs stored in the memory, and when executed by the one or more processors, performing the following operations:

acquiring at least two consecutive original images of a vehicular lane line and positioning data of the original images;

calculating, using a deep neural network model, a pixel confidence for a conformity between a pixel characteristic in the original images and a vehicular lane line characteristic;

determining an outline of the vehicular lane line from the original images and using the outline of the vehicular lane line as a candidate vehicular lane line;

calculating a vehicular lane line confidence of the candidate vehicular lane line based on the pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line; and determining map data of the vehicular lane line based on the attribute information of the vehicular lane line and the positioning data during shooting of the original images.

The embodiments of the present disclosure provide a vehicular lane line data processing method, apparatus, storage medium, and device, which acquire original images of a target road section and positioning data of the original images; calculate, using a deep neural network model, a pixel confidence for a conformity between a pixel characteristic in the original images and a vehicular lane line characteristic; determine candidate vehicular lane lines from the original images and calculate a vehicular lane line confidence of the candidate vehicular lane lines; perform discriminating and de-noising for the vehicular lane lines; recognize the attribute information of the vehicular lane lines after filtering; and determine map data of the vehicular lane line based on the attribute information of the vehicular lane line and the positioning data during shooting of the original images. By means of this method, the vehicular lane line data can be efficiently and precisely determined, the labor costs in high-precision map production is greatly reduced, and the mass production of high-precision maps can be achieved.

BRIEF DESCRIPTION OF THE DRAWINGS

To describe the technical solutions in the embodiments of the present disclosure more clearly, the accompanying drawings required for describing the embodiments will be briefly described as follows. Naturally, the accompanying drawings in the following description show merely some embodiments of the present disclosure, and a person of ordinary skills in the art may make modifications and substitutions to these drawings.

DETAILED DESCRIPTION OF EMBODIMENTS

The technical solutions in the embodiments of the present disclosure will be described clearly and fully with reference to the accompanying drawings. Clearly, the embodiments in the following description are a part of the embodiments of the present disclosure, instead of all the embodiments. These embodiments are provided to illustrate the principle of the present disclosure, and are not used to limit the present disclosure thereto. Based on the embodiments in the present disclosure, all other embodiments derived by a person of ordinary skills in the art without creative efforts shall fall within the protection scope of the present disclosure.

First Embodiment

Figure 1:
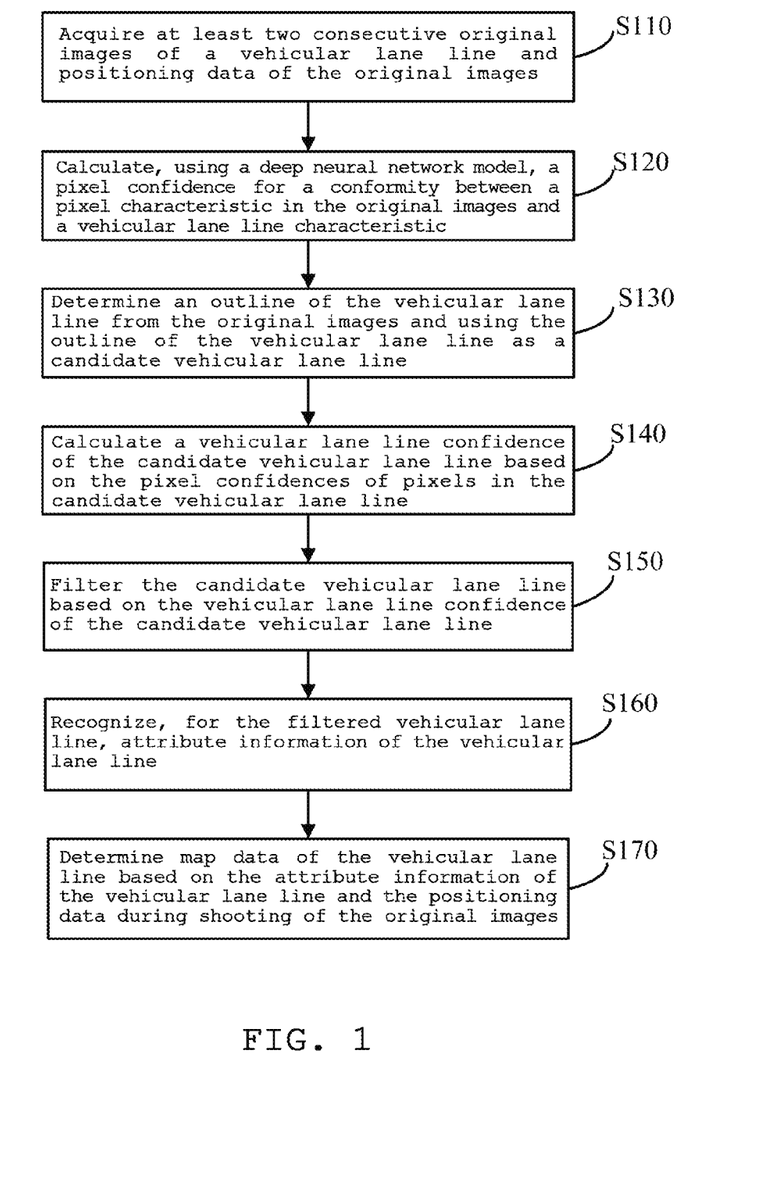
FIG. 1 is a schematic flowchart of a vehicular lane line data processing method in a first embodiment of the present disclosure.

FIG. 1 is a schematic flowchart of a vehicular lane line data processing method in the first embodiment of the present disclosure. This embodiment may be applicable to the mass production of high-precision maps. The method may be executed by a vehicular lane line data based processing apparatus, and the apparatus may be implemented in hardware and/or software.

In particular, the method may include:

S110, acquire at least two consecutive original images of a vehicular lane line and positioning data of the original images.

The above mentioned operation may specifically include acquiring a vehicular lane line image of a target road section as the original image, by mounting an industrial camera on a vehicle to shoot images with a speed of 8-10 frames per second. The Global Positioning System (GPS) may be used to perform vehicle positioning, and the reference data such as installation height, shooting angle, and shooting posture of the industrial camera in the vehicle is known, thereby the positioning data of the original image can be calculated.

It should be noted that, the installation position and installation method of the industrial camera on the vehicle are not limited, as long as the camera is capable of shooting images of the target road section, and the type, installation height, and shooting angle of the industrial camera are not limited either.

S120, calculate, using a deep neural network model, a pixel confidence for a conformity between a pixel characteristic in the original images and a vehicular lane line characteristic.

The above mentioned operation needs a prior determined deep neural network model, the deep neural network model is trained using massive sample data. Vehicular lane line image samples under various road and light conditions are acquired in advance, the pixels where the vehicular lane line is located are marked to obtain learning samples which are used to train the deep neural network, and thus the deep neural network model is determined. Thereafter, the deep neural network model may be directly used to calculate the pixel confidence for a conformity between a pixel characteristic in the original images and a vehicular lane line characteristic. The higher the similarity between the pixel and the sample characteristic is, the higher the confidence is, and vice versa. For example, when the characteristic of a given pixel in the original images is exactly the same as the characteristic of the sample, the pixel confidence of the pixel is determined to be 1. If the characteristic of a certain pixel in the original images is completely different from the characteristic of the sample, the pixel confidence of the pixel is determined to be 0.

Because the vehicular lane lines on the road have no fixed shape, and have no apparent characteristics to be distinguished from other road traffic information, such as guide lines, arrows, and some text information. It is difficult to detect the vehicular lane lines in a variety of scenarios efficiently and precisely due to the variety of the roads, such as highways, national roads, urban roads, and country roads, the impacts of illumination, camera performance, and vehicle occlusion in different weather conditions and at different time periods, as well as the abrasion of the vehicular lane line itself. In view of the recent breakthrough in the artificial intelligent deep learning technology in the last two years, the vehicular lane line image samples under various road and light conditions in practice are marked to train the deep neural network, and thus a powerful classifier is obtained for recognizing vehicular lane line information in a variety of environments. In another aspect, the deep neural network itself is a powerful classifier stronger than methods such as support vector machine (SVM).

Therefore, this embodiment preferably uses the deep neural network model.

S130, determine the outline of the vehicular lane line from the original images and use the outline of the vehicular lane line as a candidate vehicular lane line.

Preferably, the above mentioned operation specifically include extracting edge pixels from the original images by using a graphics connected domain analysis method; and performing cubic curve fitting on the edge pixels to determine an edge outline of the vehicular lane lines and using the edge outline as the candidate vehicular lane line.

Further, after determining the candidate vehicular lane line, the above mentioned operation further includes: recognizing the geometric characteristic of the candidate vehicular lane line, and filtering the candidate vehicular lane line based on the geometric characteristic.

Preferably, the geometric characteristic include the line width, the line length, a direction, and the position of the candidate vehicular lane line.

Recognizing the line width and the line length of the candidate vehicular lane line is implemented by calibrating the actual size represented by a single pixel point, and then the number of the pixel points included in the candidate vehicular lane line is calculated, so that the line width and the line length of the candidate vehicular lane line are recognized. The direction and the position of the candidate vehicular lane line are associated with the shooting posture and the positioning data of the original images. Thus, filtering the candidate vehicular lane line based on the geometric characteristic specifically includes:

filtering out and eliminating the candidate vehicular lane line having the geometric characteristic meeting at least one of the following conditions:

(1) The line length of the candidate vehicular lane line is below a preset length threshold;

the preset length threshold may be determined according to the actual situation, for example, if no vehicular lane line having a length less than 1 m is provided on the actual road, the preset length threshold may be 1 m, and if the length of the recognized candidate vehicular lane line is less than 1 m, it means that this candidate vehicular lane line is not a real vehicular lane line or a complete vehicular lane line, and the filtering and eliminating condition is met, so that this candidate vehicular lane line is eliminated.

(2) The angle between the direction of the candidate vehicular lane line and the vehicle travel direction in the original images is above a preset angle threshold;

the preset angle threshold may be determined according to the actual shooting situations, for example, when the vehicle travel direction during the shooting of the original images is right ahead, i.e., a Y direction, the lines having an angle with the vehicle travel direction greater than 30 degrees are not vehicular lane lines on the target road section, and at this time, the preset angle threshold is 30 degrees; if the angle between the direction of the candidate vehicular lane line and the vehicle travel direction of the original images is greater than 30 degrees, the filtering and eliminating condition is met and thus this candidate vehicular lane line is eliminated.

(3) The line width of the candidate vehicular lane line is above a preset width threshold;

the preset width threshold is determined from the actual situation, for example, if no vehicular lane line having a width greater than 50 m is provided on the actual road, the preset width threshold may be 50 m, and if the width of the recognized candidate vehicular lane line is greater than 50 m, it means that this candidate vehicular lane line is not a real vehicular lane line, and the filtering and eliminating condition is met, so that this candidate vehicular lane line is eliminated.

(4) The position of the candidate vehicular lane line falls between two candidate vehicular lane lines constituting a lane, and the distances between the candidate vehicular lane line and the two candidate vehicular lane lines constituting the lane are both above a preset distance threshold.

By analyzing the distance relationship between the vehicular lane lines on the actual road, the preset distance threshold is preferably 40 cm.

S140, calculate a vehicular lane line confidence of the candidate vehicular lane lines based on the pixel confidences of pixels in the candidate vehicular lane line.

Preferably, the above mentioned operation specifically includes:

collecting statistics to obtain an average value of the pixel confidences of all the pixels within the range of the outline of the candidate vehicular lane line;

obtaining a pixel having a pixel point confidence above a preset confidence threshold within the range of the outline of the candidate vehicular lane line, and using the pixel as a vehicular lane line pixel;

performing region segmentation on the original images based on the gray values of the pixels to determine a vehicular lane line region where the range of the outline of the candidate vehicular lane line is located; and performing region segmentation on the original RGB image based on pixel intensity values, to find out the vehicular lane line region where the range of the outline of the candidate vehicular lane line is located;

comparing the quantity of the vehicular lane line pixels and that of all the pixels in the vehicular lane line region to obtain a quantity ratio; that is, comparing the quantity of the vehicular lane line pixels and that of all the pixels in the segmented region of the original RGB image where the outline of the candidate vehicular lane line is located to obtain the quantity ratio as an indicator of the independence or purity thereof, for indicating whether the vehicular lane line pixels having a high confidence are all located in a communicated region; and multiplying the average value by the quantity ratio, to serve as the vehicular lane line confidence of the candidate vehicular lane line.

For example, the average value of the pixel confidence of all the pixels falling within the candidate vehicular lane line outlines obtained by collecting statistics is X (X is a number between 0 and 1); the confidence threshold is set to 0.8, and the pixel having the pixel point confidence greater than 0.8 within the range of the outline of the candidate vehicular lane line is determined as the vehicular lane line pixel, the quantity ratio of the quantity of the vehicular lane line pixel to that of all the pixels within the vehicular lane line region is Y, so that the vehicular lane line confidence of the candidate vehicular lane line is X*Y.

S150, filter the candidate vehicular lane line based on the vehicular lane line confidence of the candidate vehicular lane line.

The above mentioned operation may specifically include presetting the confidence threshold of the candidate vehicular lane line, and eliminate the candidate vehicular lane line having a confidence below the threshold.

S160, recognize, for the filtered vehicular lane line, attribute information of the vehicular lane line.

Preferably, the above mentioned operation specifically includes:

Recognize, for the filtered vehicular lane line, the line type and color of the vehicular lane line.

The line types of the vehicular lane lines include: solid line, dotted line, a complex line type consisting of solid line and dotted line, and a complex line type consisting of the solid line and the solid line. The colors of the vehicular lane line include distinct colors such as white, yellow, blue, etc. The average value of the colors of all the pixels on one vehicular lane line are calculated to recognize the color of the vehicular lane line;

Calculate the pixel size of the vehicular lane line in the original images.

Calculate the physical width, physical length, center line position, edge line position of the vehicular lane line based on shooting parameters for shooting the original images and the pixel size.

S170, determine map data of the vehicular lane line based on the positioning data during shooting of the original images and the attribute information of the vehicular lane line.

The map data of the vehicular lane line may be used in a two-dimensional map, and may also be preferably used in a three-dimensional map, that is, the above mentioned operation may specifically include:

projecting the two-dimensional vehicular lane line data to the three-dimensional map based on the attribute information of the vehicular lane line and point cloud data during shooting of the original images. Based on the physical width, physical length, center line position, and edge line position of the vehicular lane line obtained through calculation in S160, in combination with the point cloud data when the industrial cameras is used to acquire original image data, the two-dimensional vehicular lane line data is precisely projected into a three-dimensional space to form a high-precision three-dimensional map. The point cloud data includes the three-dimensional data of objects around the vehicle collected by using a laser radar device, as well as the reference data such as the installation height, shooting angle, and shooting posture of the industrial camera on the vehicle during shooting of the original images and the positioning data of the vehicle.

Figure 2:
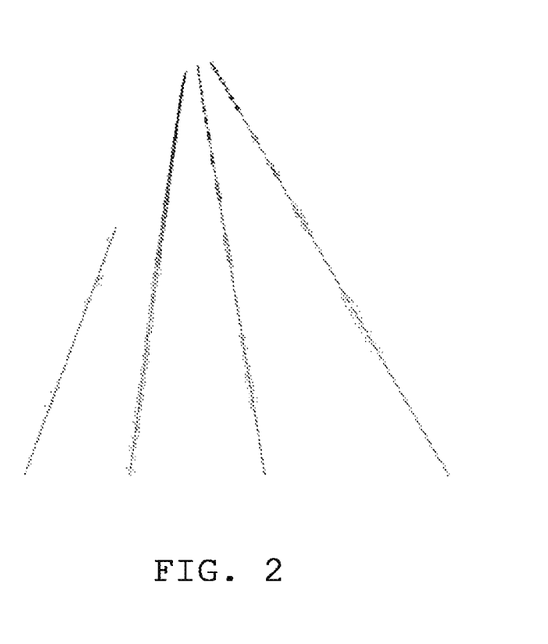
FIG. 2 is a schematic fitting diagram of vehicular lane lines in a three-dimensional space in the first embodiment of the present disclosure.

Further, after projecting the two-dimensional the vehicular lane line data into the three-dimensional map, the above mentioned operation further includes: splicing the vehicular lane lines respectively determined from the at least two original images based on the vehicular lane line confidence, the attribute information of the vehicular lane lines, and the GPS trajectory information during shooting of the original images. After calculating the position information of the vehicular lane line in the three-dimensional space, a lane topology relationship analysis is performed to determine which vehicular lane lines detected from the image constitute the same vehicular lane line in the actual three-dimensional space road network, and which two vehicular lane lines constitute a lane. As shown in FIG. 2, it is a schematic fitting diagram of vehicular lane lines in the three-dimensional space.

The technical solution of this embodiment employs technologies such as deep learning, machine vision, image processing, etc., collects original digital images of the vehicular lane line by using the industrial camera, calculates attribute information of the vehicular lane line such as the confidence, physical width, physical length, color, line type, etc., based on the original digital images, performs discriminating and de-noising for the vehicular lane line, precisely projects the calculated two-dimensional vehicular lane line data to the three-dimensional space, and performs the topology relationship analysis, fitting, and production of the vehicular lane line in the three-dimensional space. That is, it realizes using the three-dimensional digital map to precisely reconstruct the road network lane information in the real world. By means of this method, the vehicular lane line data can be efficiently and precisely determined, the labor costs in high-precision map production is greatly reduced, and the mass production of high-precision maps can be achieved.

Second Embodiment

Figure 3:
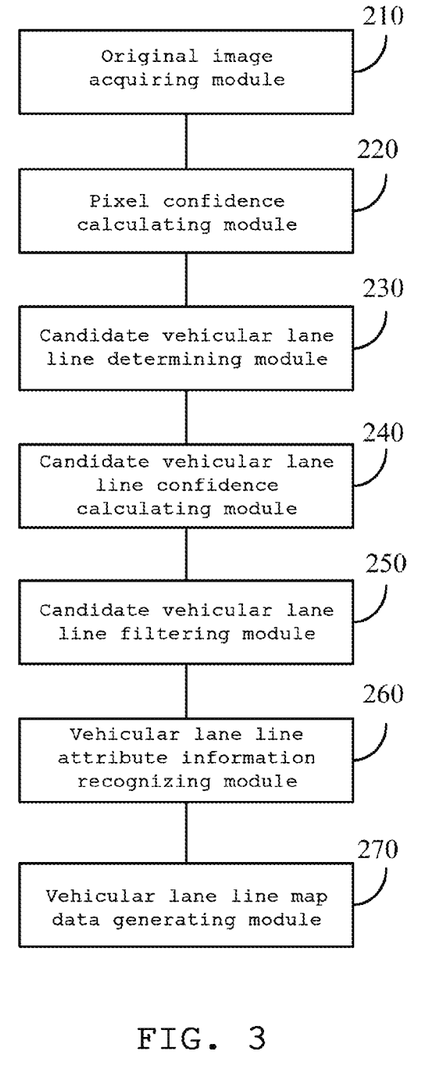
FIG. 3 is a schematic structural diagram of a vehicular lane line data processing apparatus in a second embodiment of the present disclosure.

FIG. 3 shows a schematic structural diagram of a vehicular lane line data processing apparatus according to the second embodiment of the present disclosure. As shown in FIG. 3, the apparatus specifically includes: an original image acquiring module 210, a pixel confidence calculating module 220, a candidate vehicular lane line determining module 230, a candidate vehicular lane line confidence calculating module 240, a candidate vehicular lane line filtering module 250, a vehicular lane line attribute information recognizing module 260, and a vehicular lane line map data generating module 270.

Specifically, the original image acquiring module 210 is configured to acquire at least two consecutive original images of a vehicular lane line and positioning data of the original images; the pixel confidence calculating module 220 is configured to calculating a pixel confidence for a conformity between a pixel characteristic in the original images and a vehicular lane line characteristic by using a deep neural network model; the candidate vehicular lane line determining module 230 is configured to determine an outline of the vehicular lane line from the original images and using the outline of the vehicular lane line as a candidate vehicular lane line; the candidate vehicular lane line confidence calculating module 240 is configured to calculate a vehicular lane line confidence of the candidate vehicular lane line based on the pixel confidence of pixels in the candidate vehicular lane line; the candidate vehicular lane line screening module 250 is configured to filter the candidate vehicular lane line based on the vehicular lane line confidence of the candidate vehicular lane line; the vehicular lane line attribute information recognizing module 260 is configured to recognize, for the filtered vehicular lane line, attribute information of the vehicular lane line; and the vehicular lane line map data generating module 270 is configured to determine map data of the vehicular lane line based on the attribute information of the vehicular lane line and the positioning data during shooting of the original images.

The technical solution of this embodiment employs technologies such as deep learning, machine vision, image processing, etc., collects original digital images of the vehicular lane line by using the industrial camera, calculates attribute information of the vehicular lane line such as the confidence, physical width, physical length, color, line type, etc., based on the original digital images, performs discriminating and de-noising for the vehicular lane line, precisely projects the calculated two-dimensional vehicular lane line data to the three-dimensional space, and performs the topology relationship analysis, fitting, and production of the vehicular lane line in the three-dimensional space. That is, it realizes using the three-dimensional digital map to precisely reconstruct the road network lane information in the real world. By means of this method, the vehicular lane line data can be efficiently and precisely determined, the labor costs in high-precision map production is greatly reduced, and the mass production of high-precision maps can be achieved.

Preferably, the candidate vehicular lane line determining module 230 includes an edge pixel extracting unit and a candidate vehicular lane line determining unit.

Specifically, the edge pixel extracting unit is configured to extract edge pixels from the original images by using a graphics connected domain analysis method; and the candidate vehicular lane line determining unit is configured to perform cubic curve fitting on the edge pixels to determine the edge outline of the vehicular lane line and use the edge outline as the candidate vehicular lane line.

Further, on the basis of the above solution, the apparatus further includes a candidate vehicular lane line filtering module, configured to, after determining the candidate vehicular lane lines, recognize the geometric characteristic of the candidate vehicular lane line; and filter the candidate vehicular lane line based on the geometric characteristic. The geometric characteristic include the line width, line length, direction, and position of the candidate vehicular lane line. Filtering the candidate vehicular lane line based on the geometric characteristic includes:

filtering and eliminating the candidate vehicular lane line having the geometric characteristic meeting at least one of the following conditions:

the line length of the candidate vehicular lane line is below a preset length threshold;

an angle between the direction of the candidate vehicular lane line and the vehicle travel direction in the original images is above a preset angle threshold;

the line width of the candidate vehicular lane line is above a preset width threshold; and the position of the candidate vehicular lane line falls between two candidate vehicular lane lines constituting a lane, and the distances between the candidate vehicular lane line and the two candidate vehicular lane lines constituting the lane are both above a preset distance threshold.

Preferably, the candidate vehicular lane line confidence calculating module 240 includes: a pixel confidence average value statistics unit, a vehicular lane line pixel determining unit, a vehicular lane line region determining unit, and a vehicular lane line confidence calculating unit.

Specifically, the pixel confidence average value statistics unit is configured to collect statistics to obtain an average value of the pixel confidences of all the pixels within the range of the outline of the candidate vehicular lane line; the vehicular lane line pixel determining unit is configured to obtain a pixel having a pixel point confidence above a preset confidence threshold within the range of the outline of the candidate vehicular lane line, and use the pixel as a vehicular lane line pixel; the vehicular lane line region determining unit is configured to perform region segmentation on the original images based on gray values of the pixels to determine a vehicular lane line region where the range of the outline of the candidate vehicular lane line outlines; the vehicular lane line confidence calculating unit is configured to compare a quantity of the vehicular lane line pixel and a quantity of all the pixels in the vehicular lane line region to obtain a quantity ratio, and to multiply the average value by the quantity ratio to serve as the vehicular lane line confidence of the candidate vehicular lane line.

Preferably, the vehicular lane line attribute information recognizing module 260 includes a vehicular lane line type and color recognizing unit and a vehicular lane line physical parameter calculating unit.

Specifically, the vehicular lane line type and color recognizing unit is configured to recognize, for the filtered vehicular lane line, the line type and color of the vehicular lane line; the vehicular lane line physical parameter calculating unit is configured to calculate the pixel size of the vehicular lane line in the original images and the physical width, physical length, center line position, and edge line position of the vehicular lane line based on the pixel size and a shooting parameter for shooting the original images.

Preferably, the vehicular lane line map data generating module 270 includes a vehicular lane line data projecting unit.

Specifically, the vehicular lane line data projecting unit is configured to project the two-dimensional vehicular lane line data to a three-dimensional map based on the attribute information of the vehicular lane line and point cloud data during shooting of the original images.

On the basis of the above mentioned solution, preferably, the apparatus further includes: a vehicular lane line splicing module configured to, after projecting the two-dimensional the vehicular lane line data into the three-dimensional map, splice the vehicular lane lines respectively determined from the at least two original images based on the vehicular lane line confidence, the attribute information of the vehicular lane line, and GPS trajectory information during shooting of the original images.

The above mentioned apparatus is capable of executing the method provided by any embodiment of the present disclosure, and comprises corresponding functional modules for executing the method and has the beneficial effects thereof.

It should be appreciated that the above is related to merely preferred embodiments of the present disclosure and the technical principles applied therein. Persons skilled in the art should understand that the present disclosure is not limited to the specific embodiments described herein, and persons skilled in the art are capable of making obvious changes, re-adjustments, and replacements without departing from the protection scope of the present disclosure. Therefore, although the present disclosure is described in detail through these embodiments, the present disclosure is not limited to merely the above mentioned embodiments, and may further include more other equivalent embodiments without departing from the concept of the present disclosure, and the scope of the present disclosure is defined by the scope of the attached claims.

It should be pointed out that, according to the implementation requirements, each component/step described in the present application may be split into more components/steps, or two or more components/steps or partial operations of the components/steps may also be combined into a new component/step, thereby achieving the objective of the present disclosure.

The above mentioned method according to the present disclosure may be implemented in hardware or firmware, or implemented as software or computer codes that can be stored in a recording medium (such as CD ROM, RAM, floppy disk, hard disk, or magneto-optical disc), or implemented as computer codes which are initially stored in a remote recording medium or a non-transitory machine readable medium and then downloaded through a network and stored in a local recording medium. Thereby, the method described herein may be processed by such software stored in a record medium using a computer, a dedicated processor, or programmable or dedicated hardware (such as ASIC or FPGA). It should be understood that a computer, a processor, a microprocessor controller, or programmable hardware includes a storage component (such as, RAM, ROM, a flash memory, and so on) that can store or receive software or computer codes, and the processing method described herein is implemented when the software or computer codes are accessed and executed by the computer, processor, or hardware. In addition, when a general-purpose computer accesses the codes for implementing the processing mentioned herein, the execution of the codes converts the general-purpose computer into a dedicated computer for executing the processing mentioned herein.

Third Embodiment

The embodiment of the present disclosure provides one or more storage media including computer executable instructions, and the computer executable instructions, when executed by a processor of a computer, execute a vehicular lane line data processing method, the method including the following steps:

acquiring at least two consecutive original images of a vehicular lane line and positioning data of the original images;

calculating, using a deep neural network model, a pixel confidence for a conformity between a pixel characteristic in the original images and a vehicular lane line characteristic;

determining an outline of the vehicular lane line from the original images and using the outline of the vehicular lane line as a candidate vehicular lane line;

calculating a vehicular lane line confidence of the candidate vehicular lane line based on the pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line;

determining map data of the vehicular lane line based on the attribute information of the vehicular lane line and the positioning data during shooting of the original images.

When the above mentioned storage medium executes the method, determining the outline of the vehicular lane line from the original images and using the outline of the vehicular lane line as the candidate vehicular lane line may include:

extracting, using a graphics connected domain analysis method, edge pixels from the original images; and performing cubic curve fitting on the edge pixels to determine an edge outline of the vehicular lane line, and using the edge outline as the candidate vehicular lane line.

When the above mentioned storage medium executes the method, after determining the candidate vehicular lane line, it may further include:

recognizing the geometric characteristic of the candidate vehicular lane line; and filtering the candidate vehicular lane line based on the geometric characteristic.

When the above mentioned storage medium executes the method, the geometric characteristic may include a line width, line length, direction, and position of the candidate vehicular lane line, and filtering the candidate vehicular lane line based on the geometric characteristic may include:

filtering out and eliminating the candidate vehicular lane line having the geometric characteristic meeting at least one of the following conditions:

the line length of the candidate vehicular lane line is below a preset length threshold;

an angle between the direction of the candidate vehicular lane line and the vehicle travel direction in the original images is above a preset angle threshold;

the line width of the candidate vehicular lane line is above a preset width threshold; and the position of the candidate vehicular lane line falls between two candidate vehicular lane lines constituting a lane, and the distances between the candidate vehicular lane line and the two candidate vehicular lane lines constituting the lane are both above a preset distance threshold.

When the above mentioned storage medium executes the method, calculating the vehicular lane line confidence of the candidate vehicular lane line based on the pixel confidences of the pixels in the candidate vehicular lane line may include:

collecting statistics to obtain an average value of the pixel confidences of all the pixels within a range of an outline of the candidate vehicular lane line;

obtaining a pixel having a pixel point confidence above a preset confidence threshold within the range of the outline of the candidate vehicular lane line, and using the obtained pixel as a vehicular lane line pixel;

performing region segmentation on the original images based on gray values of the pixels to determine a vehicular lane line region where the range of the outline of the candidate vehicular lane line is located;

comparing the quantity of the vehicular lane line pixel and that of all the pixels in the vehicular lane line region to obtain a quantity ratio;

multiplying the average value by the quantity ratio, to serve as the vehicular lane line confidence of the candidate vehicular lane line.

When the above mentioned storage medium executes the method, recognizing, for the filtered vehicular lane line, the attribute information of the vehicular lane line may include:

recognizing, for the filtered vehicular lane line, the line type and color of the vehicular lane line;

calculating the pixel size of the vehicular lane line in the original images; and calculating the physical width, physical length, center line position, and edge line position of the vehicular lane line based on the pixel size and a shooting parameter for shooting the original images.

When the above mentioned storage medium executes the method, determining the map data of the vehicular lane line based on the attribute information of the vehicular lane line and the positioning data during shooting of the original images may include:

projecting the two-dimensional vehicular lane line data to a three-dimensional map based on the attribute information of the vehicular lane lines and point cloud data during shooting of the original images.

When the above mentioned storage medium executes the method, it may further include, after projecting the two-dimensional vehicular lane line data to the three-dimensional map:

splicing the vehicular lane lines respectively determined from the at least two original images based on the vehicular lane line confidence, the attribute information of the vehicular lane lines, and GPS trajectory information during shooting of the original images.

Fourth Embodiment

Figure 4:
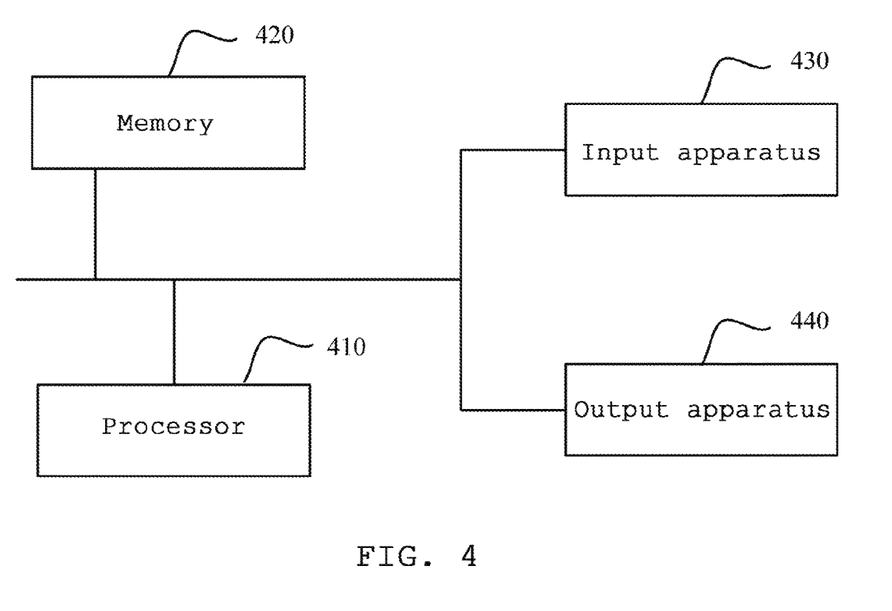
FIG. 4 is a schematic diagram of a hardware structure of a device for a vehicular lane line data processing method in a fourth embodiment of the present disclosure.

FIG. 4 is a schematic diagram of a hardware structure of a device for a vehicular lane line data processing method according to the fourth embodiment of the present disclosure. With reference to FIG. 4, the device may specifically include:

one or more processors 410, and only one processor 410 is shown in FIG. 4 as an example;

a memory 420; and one or more modules.

The device may further include: an input apparatus 430 and an output apparatus 440. The processor 410, the memory 420, the input apparatus 430, and the output apparatus 440 in the device may be connected via a bus or or in other manners, and bus connection is taken as an example in FIG. 4.

As a computer-readable storage medium, the memory 420 may be used for storing software programs, computer executable programs and modules, such as the program instructions/modules corresponding to the vehicular lane line data processing method in the embodiments of the present disclosure (e.g., the original image acquiring module 210, the pixel confidence calculating module 220, the candidate vehicular lane line determining module 230, the candidate vehicular lane line confidence calculating module 240, the candidate vehicular lane line filtering module 250, the vehicular lane line attribute information recognizing module 260, and the vehicular lane line map data generating module 270 in the vehicular lane line data processing apparatus as shown in FIG. 3). The processor 410 executes the software programs, instructions and modules stored in the memory 420 to perform various functional applications and data processing of the sever, namely, to implement the vehicular lane line data processing method in the above mentioned embodiments for the method.

The memory 420 may include a program storage area and a data storage area. The program storage area may store an operating system and an application program required by at least one function. The data storage area may store data and the like created according to the use of the device. In addition, the memory 420 may include a high-speed random access memory, and may further include a non-volatile memory, e.g., at least one disk storage device, a flash memory device or other non-volatile solid-state storage devices. In some examples, the memory 420 may further include memories which are deployed remotely relative to the processor 410, and these remote memories may be connected to a terminal device through a network. Examples of the above mentioned network include, but are not limited to, the Internet, an enterprise intranet, a local area network, a mobile communication network and the combinations thereof.

The input apparatus 430 may be used for receiving the input number or character information and generating a key signal input related to the user setting and function control of a terminal. The output apparatus 440 may include a display device such as a display screen.

The one or more modules are stored in the memory 420, and when executed by the one or more processors 410, execute the following operations: acquiring at least two consecutive original images of a vehicular lane line and positioning data of the original images;

calculating, using a deep neural network model, a pixel confidence for a conformity between a pixel characteristic in the original images and a vehicular lane line characteristic;

determining the outline of the vehicular lane line from the original images and using the outline of the vehicular lane line as a candidate vehicular lane line;

calculating the vehicular lane line confidence of the candidate vehicular lane line based on the pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line;

determining the map data of the vehicular lane line based on the attribute information of the vehicular lane line and the positioning data during shooting of the original images.

Preferably, determining the outline of the vehicular lane line from the original images and using the outline of the vehicular lane line as the candidate vehicular lane line includes:

extracting, using a graphics connected domain analysis method, edge pixels from the original images; and performing cubic curve fitting on the edge pixels to determine the edge outline of the vehicular lane line, and using the edge outline as the candidate vehicular lane line.

Further, the operation further includes, after the determining of the candidate vehicular lane line:

recognizing the geometric characteristic of the candidate vehicular lane line; and filtering the candidate vehicular lane line based on the geometric characteristic.

Further, the geometric characteristics include the line width, line length, direction, and position of the candidate vehicular lane line, and filtering the candidate vehicular lane line based on the geometric characteristic includes:

filtering out and eliminating the candidate vehicular lane line having the geometric characteristic meeting at least one of the following conditions:

the line length of the candidate vehicular lane line is below a preset length threshold;

an angle between the direction of the candidate vehicular lane line and a vehicle travel direction in the original images is above a preset angle threshold;

the line width of the candidate vehicular lane line is above a preset width threshold;

the position of the candidate vehicular lane line falls between two candidate vehicular lane lines constituting a lane, and the distances between the candidate vehicular lane line and the two candidate vehicular lane lines constituting the lane are both above a preset distance threshold.

Further, calculating the vehicular lane line confidence of the candidate vehicular lane line based on the pixel confidences of the pixels in the candidate vehicular lane line includes:

collecting statistics to obtain the average value of the pixel confidences of all the pixels within the range of the outline of the candidate vehicular lane line;

obtaining a pixel having a pixel point confidence above a preset confidence threshold within the range of the outline of the candidate vehicular lane line, and using the obtained pixel as a vehicular lane line pixel;

performing region segmentation on the original images based on gray values of the pixels to determine a vehicular lane line region where the range of the outline of the candidate vehicular lane line is located;

comparing the quantity of the vehicular lane line pixel and the quantity of all the pixels in the vehicular lane line region to obtain a quantity ratio; and multiplying the average value by the quantity ratio, to serve as the vehicular lane line confidence of the candidate vehicular lane line.

Preferably, recognizing, for the filtered vehicular lane line, the attribute information of the vehicular lane line includes:

recognizing, for the filtered vehicular lane line, the line type and color of the vehicular lane line;

calculating the pixel size of the vehicular lane line in the original images; and calculating the physical width, physical length, center line position, and edge line position of the vehicular lane line based on the pixel size and a shooting parameter for shooting the original images.

Preferably, determining the map data of the vehicular lane line based on the attribute information of the vehicular lane line and the positioning data during shooting of the original images includes:

projecting the two-dimensional vehicular lane line data to a three-dimensional map based on the attribute information of the vehicular lane lines and point cloud data during shooting of the original images.

Further, the operation further includes, after projecting the two-dimensional vehicular lane line data to the three-dimensional map:

splicing the vehicular lane lines respectively determined from the at least two original images based on the vehicular lane line confidence, the attribute information of the vehicular lane lines, and GPS trajectory information during shooting of the original images.

According to the foregoing description of the embodiments, it should be clearly understood by those skilled in the art that the present disclosure may be implemented by means of software and necessary general hardware, and naturally may be implemented by means of hardware. In most cases, the former implementation is preferred. Based on such an understanding, the technical solutions in the present disclosure essentially, or the part contributing to the prior art may be implemented in the form of a software product. The computer software product may be stored in a computer readable storage medium, such as a magnetic disk, an optical disc, a Read-Only Memory (ROM), or a Random Access Memory (RAM), and includes several instructions which cause a computer device (which may be a personal computer, a server, a network device, etc.) to perform the method described in the embodiments of the present disclosure.

It should be noted that, in the above-mentioned embodiments of the vehicular lane line data processing apparatus, the modules and sub-modules are divided based on functional logic only, but the present disclosure is not limited to the above division as long as corresponding functions can be implemented.

In addition, the specific names of the functional units are used only for distinguishing one from another, but do not intend to limit the protection scope of the present disclosure.

The embodiments are described in the specification in a progressive manner. The description of individual embodiments emphasises the difference thereof as compared with other embodiments, and the common or similar part between the embodiments can be known by referring to each other.

Described above are merely exemplary embodiments of the present disclosure, but the protection scope of the present disclosure is not limited thereto. Any variations or substitutions readily conceivable to those skilled in the art within the disclosed technical scope of the present disclosure shall fall within the protection scope of the present disclosure. Accordingly, the protection scope of the present disclosure is defined by the protection scope of the claims.

What is claimed is:

1. A vehicular lane line data processing method, comprising:

acquiring at least two consecutive original images of a vehicular lane line and positioning data of the original images;

calculating, using a deep neural network model, a pixel confidence for a conformity between a pixel characteristic in the original images and a vehicular lane line characteristic;

determining an outline of the vehicular lane line from the original images and using the outline of the vehicular lane line as a candidate vehicular lane line;

calculating a vehicular lane line confidence of the candidate vehicular lane line based on pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line; and determining map data of the vehicular lane line based on the attribute information of the vehicular lane line and the positioning data during acquisition of the original images.

2. The method according to claim 1, wherein, determining the outline of the vehicular lane line from the original images and using the outline of the vehicular lane line as the candidate vehicular lane line comprises:

extracting, using a graphics connected domain analysis method, edge pixels from the original images; and performing cubic curve fitting on the edge pixels to determine an edge outline of the vehicular lane line, and using the edge outline as the candidate vehicular lane line.

3. The method according to claim 1, further comprising, after the determining of the candidate vehicular lane line:

recognizing a geometric characteristic of the candidate vehicular lane line; and filtering the candidate vehicular lane line based on the geometric characteristic.

4. The method according to claim 3, wherein, geometric characteristic comprises a line width, line length, direction, and position of the candidate vehicular lane line, and
   filtering the candidate vehicular lane line based on the geometric characteristic comprises:
      filtering out and eliminating the candidate vehicular lane line including the geometric characteristic meeting at least one of the following conditions:
         the line length of the candidate vehicular lane line is below a preset length threshold;
         an angle between the direction of the candidate vehicular lane line and a vehicle travel direction in the original images is above a preset angle threshold;
         the line width of the candidate vehicular lane line is above a preset width threshold; or
         the position of the candidate vehicular lane line falls between two candidate vehicular lane lines constituting a lane, and distances between the candidate vehicular lane line and the two candidate vehicular lane lines constituting the lane are both above a preset distance threshold.

5. The method according to claim 1, wherein, calculating the vehicular lane line confidence of the candidate vehicular lane line based on the pixel confidences of the pixels in the candidate vehicular lane line comprises:
   collecting statistics to obtain an average value of the pixel confidences of all the pixels within a range of an outline of the candidate vehicular lane line;
   obtaining a pixel including a pixel point confidence above a preset confidence threshold within the range of the outline of the candidate vehicular lane line, and using the obtained pixel as a vehicular lane line pixel;
   performing region segmentation on the original images based on gray values of the pixels to determine a vehicular lane line region where the range of the outline of the candidate vehicular lane line is located;
   comparing a quantity of the vehicular lane line pixel and a quantity of all the pixels in the vehicular lane line region to obtain a quantity ratio; and
   multiplying the average value by the quantity ratio, to serve as the vehicular lane line confidence of the candidate vehicular lane line.

6. The method according to claim 1, wherein, recognizing, for the filtered vehicular lane line, the attribute information of the vehicular lane line comprises:
   recognizing, for the filtered vehicular lane line, a line type and color of the vehicular lane line;
   calculating a pixel size of the vehicular lane line in the original images; and
   calculating a physical width, physical length, center line position, and edge line position of the vehicular lane line based on the pixel size and a shooting parameter for shooting the original images.

7. The method according to claim 1,
   wherein, determining the map data of the vehicular lane line based on the attribute information of the vehicular lane line and the positioning data during shooting of the original images comprises:
      projecting two-dimensional vehicular lane line data to a three-dimensional map based on the attribute information of the vehicular lane lines and point cloud data during shooting of the original images.

8. The method according to claim 1, further comprising, after projecting two-dimensional vehicular lane line data to a three-dimensional map:
   splicing the vehicular lane lines respectively determined from the at least two original images based on the vehicular lane line confidence, the attribute information of the vehicular lane lines, and GPS trajectory information during shooting of the original images.

9. A vehicular lane line data processing apparatus, comprising:
   an original image acquiring module configured to acquire at least two consecutive original images of a vehicular lane line and positioning data of the original images;
   a pixel confidence calculating module configured to calculate, using a deep neural network model, a pixel confidence for a conformity between a pixel characteristic in the original images and a vehicular lane line characteristic;
   a candidate vehicular lane line determining module configured to determine an outline of the vehicular lane line from the original images and using the outline of the vehicular lane line as a candidate vehicular lane line;
   a candidate vehicular lane line confidence calculating module configured to calculate a vehicular lane line confidence of the candidate vehicular lane line based on pixel confidences of pixels in the candidate vehicular lane line;
   a candidate vehicular lane line filtering module configured to filter the candidate vehicular lane line based on the vehicular lane line confidence of the candidate vehicular lane line;
   a vehicular lane line attribute information recognizing module configured to recognize, for the filtered vehicular lane line, attribute information of the vehicular lane line; and
   a vehicular lane line map data generating module configured to determine map data of the vehicular lane line based on the attribute information of the vehicular lane line and the positioning data during acquisition of the original images.

10. The apparatus according to claim 9, wherein, the candidate vehicular lane line determining module comprises:
   an edge pixel extracting unit configured to extract, using a graphics connected domain analysis method, edge pixels from the original images; and
   a candidate vehicular lane line determining unit configured to perform cubic curve fitting on the edge pixels to determine an edge outline of the vehicular lane line, and use the edge outline as the candidate vehicular lane line.

11. The apparatus according to claim 9, further comprising:
   the candidate vehicular lane line filtering module configured to, after determining the candidate vehicular lane line, recognize a geometric characteristic of the candidate vehicular lane line, and filter the candidate vehicular lane line based on the geometric characteristic.

12. The apparatus according to claim 11, wherein, the geometric characteristic comprises a line width, line length, direction, and position of the candidate vehicular lane line, and
   filtering the candidate vehicular lane line based on the geometric characteristic comprises:
      filtering out and eliminating the candidate vehicular lane line including the geometric characteristic meeting at least one of the following conditions:
         the line length of the candidate vehicular lane line is below a preset length threshold;

an angle between the direction of the candidate vehicular lane line and a vehicle travel direction in the original images is above a preset angle threshold;

the line width of the candidate vehicular lane line is above a preset width threshold; or the position of the candidate vehicular lane line falls between two candidate vehicular lane lines constituting a lane, and distances between the candidate vehicular lane line and the two candidate vehicular lane lines constituting the lane are both above a preset distance threshold.

13. The apparatus according to claim 9, wherein, the candidate vehicular lane line confidence calculating module comprises:

a pixel confidence average value statistics unit for collecting statistics to obtain an average value of the pixel confidences of all the pixels within a range of an outline of the candidate vehicular lane line;

a vehicular lane line pixel determining unit for obtaining a pixel including a pixel point confidence above a preset confidence threshold within the range of the outline of the candidate vehicular lane line, and using the obtained pixel as a vehicular lane line pixel;

a vehicular lane line region determining unit for performing region segmentation on the original images based on gray values of the pixels to determine a vehicular lane line region where the range of the outline of the candidate vehicular lane line is located; and a vehicular lane line confidence calculating unit for comparing a quantity of the vehicular lane line pixel and a quantity of all the pixels in the vehicular lane line region to obtain a quantity ratio; and multiplying the average value by the quantity ratio, to serve as the vehicular lane line confidence of the candidate vehicular lane line.

14. The apparatus according to claim 9, wherein, the vehicular lane line attribute information recognizing module comprises:

a vehicular lane line type and color recognizing module for recognizing, for the filtered vehicular lane line, a line type and color of the vehicular lane line; and a vehicular lane line physical parameter calculating unit for calculating a pixel size of the vehicular lane line in the original images, and calculating a physical width, physical length, center line position, and edge line position of the vehicular lane line based on the pixel size and a shooting parameter for shooting the original images.

15. The apparatus according to claim 9, wherein, the vehicular lane line map data generating module comprises:

a vehicular lane line data projecting unit for projecting two-dimensional vehicular lane line data to a three-dimensional map based on the attribute information of the vehicular lane line and point cloud data during shooting of the original images.

16. The apparatus according to claim 9, further comprising:

a vehicular lane line splicing module configured to, after projecting two-dimensional vehicular lane line data to a three-dimensional map, splice the vehicular lane lines respectively determined from the at least two original images based on the vehicular lane line confidence, the attribute information of the vehicular lane lines, and GPS trajectory information during shooting of the original images.

17. A non-volatile computer storage medium storing a plurality of instructions that, when executed by a processor of a computer, causes the processor to perform the method of:

acquiring at least two consecutive original images of a vehicular lane line and positioning data of the original images;

calculating, using a deep neural network model, a pixel confidence for a conformity between a pixel characteristic in the original images and a vehicular lane line characteristic;

determining an outline of the vehicular lane line from the original images and using the outline of the vehicular lane line as a candidate vehicular lane line;

calculating a vehicular lane line confidence of the candidate vehicular lane line based on pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line; and determining map data of the vehicular lane line based on the attribute information of the vehicular lane line and the positioning data during acquisition of the original images.

18. A device, comprising:

one or more processors;

a memory;

one or more programs stored in the memory and, when executed by the one or more processors, performing the following operations:

acquiring at least two consecutive original images of a vehicular lane line and positioning data of the original images;

calculating, using a deep neural network model, a pixel confidence for a conformity between a pixel characteristic in the original images and a vehicular lane line characteristic;

determining an outline of the vehicular lane line from the original images and using the outline of the vehicular lane line as a candidate vehicular lane line;

calculating a vehicular lane line confidence of the candidate vehicular lane line based on pixel confidences of pixels in the candidate vehicular lane line;

filtering the candidate vehicular lane line based on the vehicular lane line confidence of the candidate vehicular lane line;

recognizing, for the filtered vehicular lane line, attribute information of the vehicular lane line; and determining map data of the vehicular lane line based on the attribute information of the vehicular lane line and the positioning data during acquisition of the original images.

* * * * *